United States Patent
Feddersen

(10) Patent No.: US 8,568,067 B2
(45) Date of Patent: *Oct. 29, 2013

(54) GUN DRILL GUIDE AND GUN DRILL GUIDE ASSEMBLY

(75) Inventor: Frederick J. Feddersen, Knoxville, TN (US)

(73) Assignee: F.J. Feddersen, Inc., Loudon, TN (US)

( * ) Notice: Subject to any disclaimer, the term of this patent is extended or adjusted under 35 U.S.C. 154(b) by 1282 days.

This patent is subject to a terminal disclaimer.

(21) Appl. No.: 11/710,438

(22) Filed: Feb. 26, 2007

(65) Prior Publication Data

US 2007/0280794 A1    Dec. 6, 2007

Related U.S. Application Data

(63) Continuation of application No. 10/768,691, filed on Feb. 2, 2004, now Pat. No. 7,207,751.

(51) Int. Cl.
*B23B 49/02* (2006.01)

(52) U.S. Cl.
USPC ............ 408/115 R; 408/72 B; 408/705

(58) Field of Classification Search
USPC ......... 408/67, 110, 111, 115 R, 115 B, 72 B, 408/241 B, 705, 57, 59, 56
IPC .................. B23B 49/02; B23Q 11/02
See application file for complete search history.

(56) References Cited

U.S. PATENT DOCUMENTS

| | | | | |
|---|---|---|---|---|
| 3,317,216 A | * | 5/1967 | Muthler | 277/358 |
| 3,361,014 A | * | 1/1968 | McClennan | 408/199 |
| 3,603,600 A | * | 9/1971 | Lutz | 277/345 |
| 3,606,560 A | * | 9/1971 | McClennan | 408/59 |
| 4,591,300 A | * | 5/1986 | Weiblen et al. | 408/59 |
| 4,726,717 A | * | 2/1988 | Schmid | 408/118 |
| 5,181,812 A | * | 1/1993 | Labinka | 408/234 |
| 7,207,751 B2 | * | 4/2007 | Feddersen | 408/115 R |

FOREIGN PATENT DOCUMENTS

| | | | |
|---|---|---|---|
| EP | 1563951 A1 | * | 8/2005 |
| FR | 2261828 A | * | 10/1975 |
| SU | 997994 A | * | 2/1983 |

OTHER PUBLICATIONS

PTO Translation of FR 2261828, Translated by Steven Spar, Sep. 2010.*

* cited by examiner

*Primary Examiner* — Daniel Howell
(74) *Attorney, Agent, or Firm* — Breiner & Breiner, L.L.C.

(57) ABSTRACT

A gun drill guide is disclosed comprising a cylinder body member of a resilient polymer material having a central opening extending therethrough, a radially extending flange means at one end thereof to engage the end face of a bearing assembly and an annular groove near the opposite end thereof defined by second and third radially extending flanges for engaging the opposite end face of the bearing assembly. A locking member, a chip deflector assembly, a stabilizer assembly or other guide attachment are disclosed which may be attached to the drill guide.

8 Claims, 4 Drawing Sheets

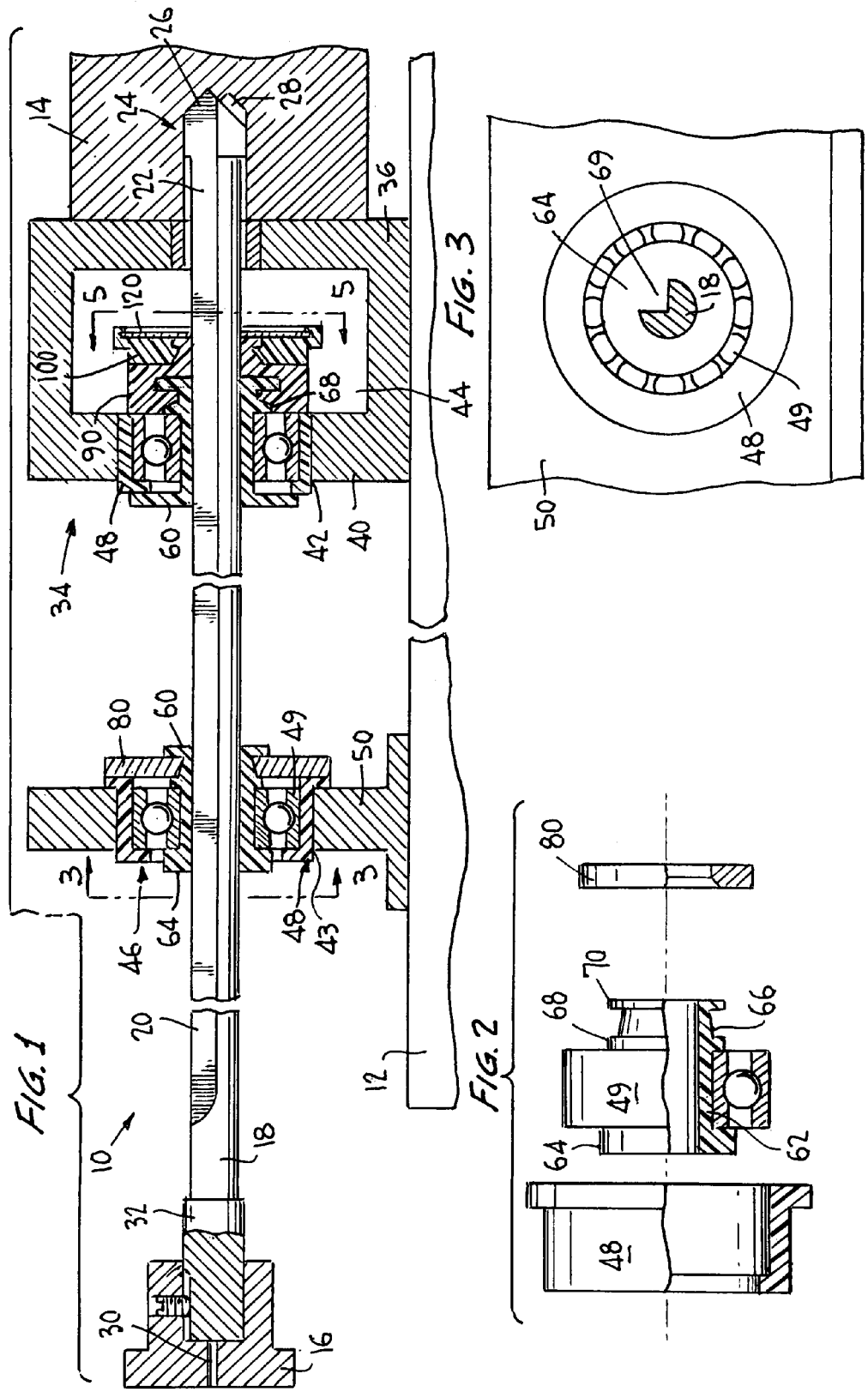

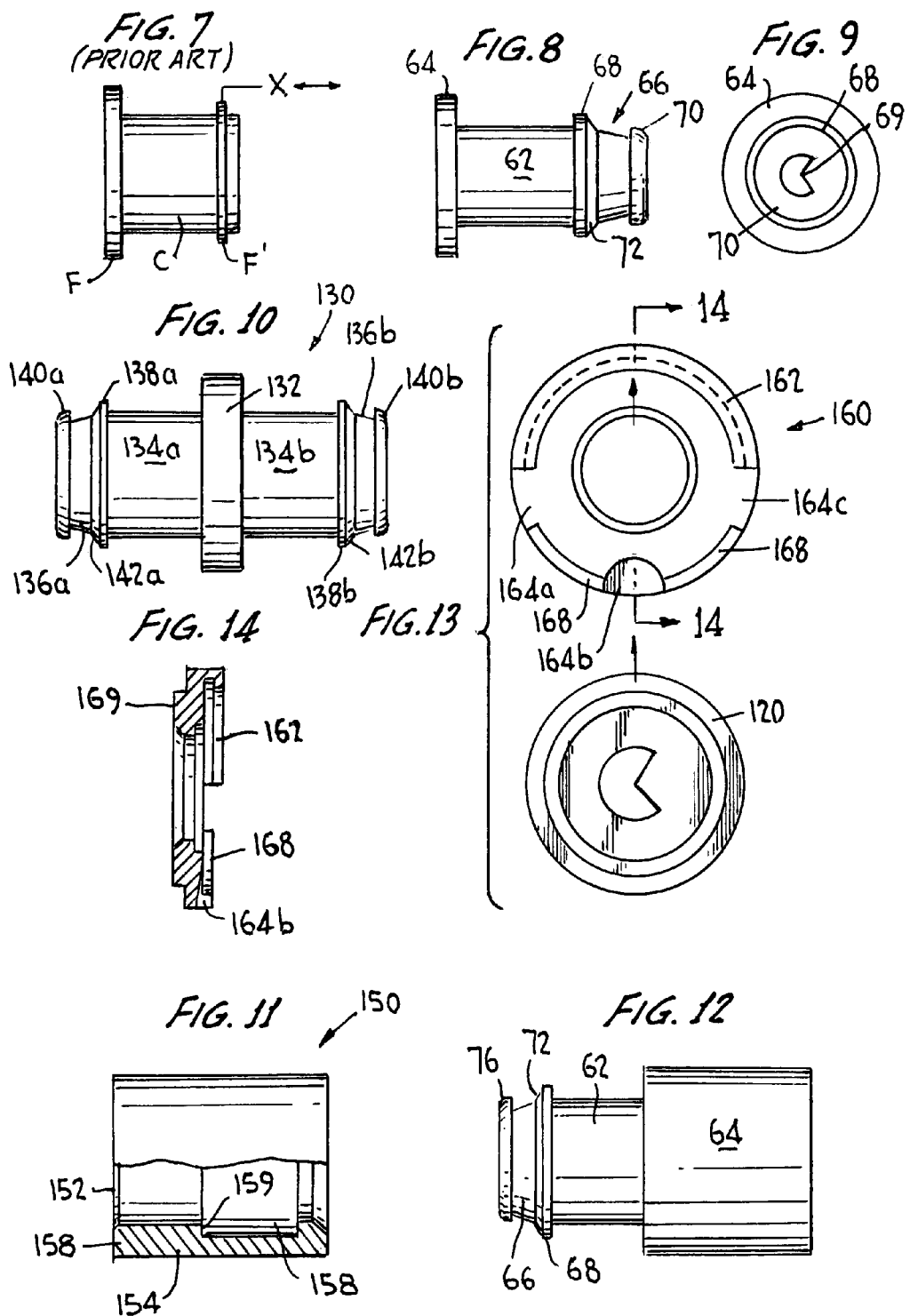

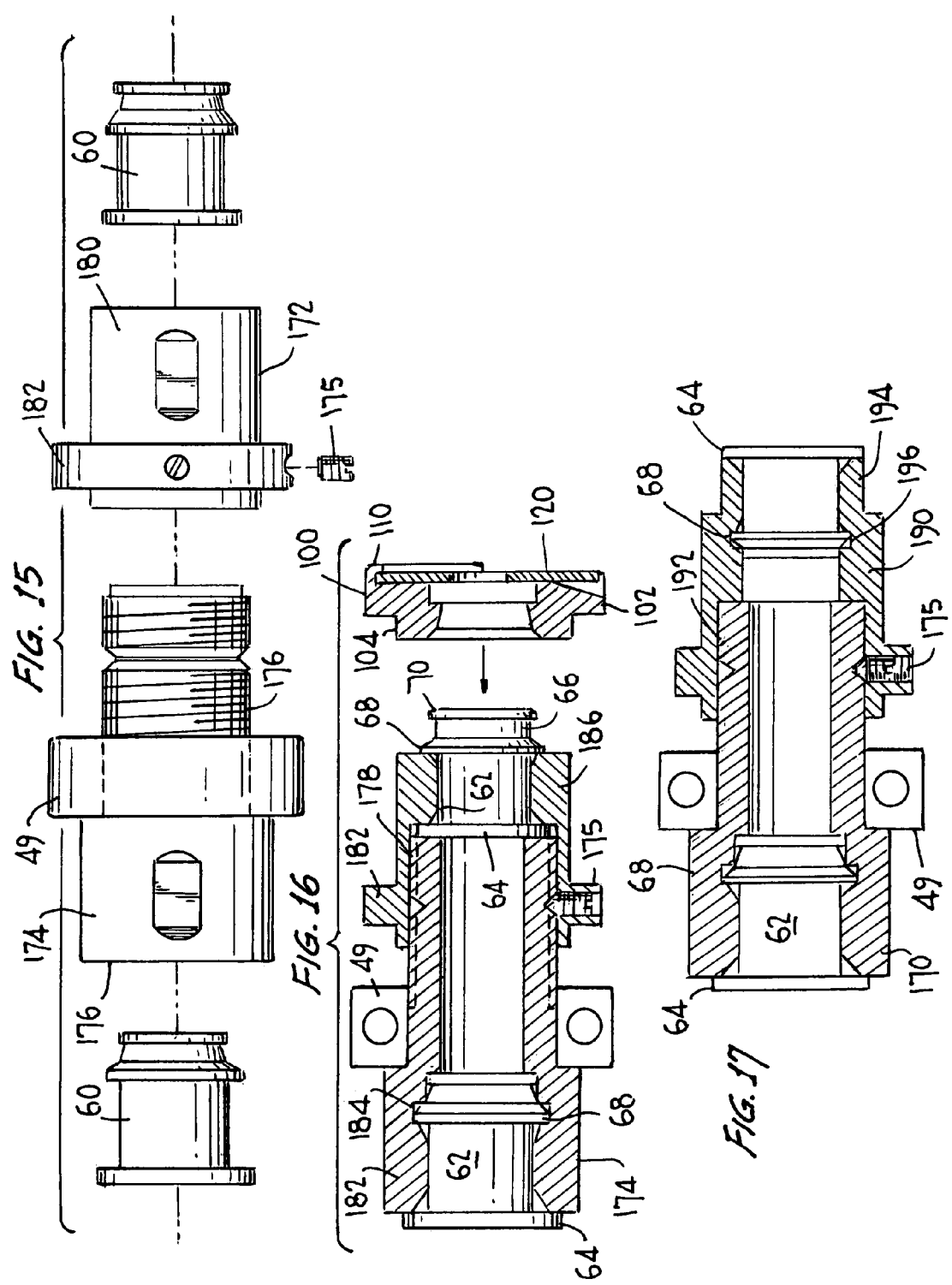

GUN DRILL GUIDE AND GUN DRILL GUIDE ASSEMBLY

This application is a continuation of application Ser. No. 10/768,691 filed Feb. 2, 2004, now U.S. Pat. No. 7,207,751 B2 issued Apr. 24, 2007.

FIELD OF INVENTION

This invention relates to a gun drill guide and gun drill guide assembly. More specifically, the invention relates to a gun drill guide and gun drill guide assembly which reduces the whipping, vibration and bowing of the drill. The gun drill guide and assembly provide a means for keeping the guide from popping out of a bearing and provide a means to secure a chip deflector in a chip box to deflect chips and lubricant. The gun drill guide and assembly provide for more efficient operation of the gun drill and will, consequently, save substantial time and expense in the drilling of gun barrels and other materials.

BACKGROUND OF THE INVENTION

Gun drill guides are well known in the art. They are used to help prevent the tendency of the drill shaft to whip, bow and vibrate when the drill is operated at relatively high rpms. However, such whipping, bowing and vibration cannot fully be overcome with a gun drill having only one cutting edge because the drill shaft is off balance and not on the center of gravity. Thus, the gun drill shaft includes a V-shaped angle which changes the center of gravity and the drill shaft whips off center at the middle, between the guide supports for the shaft. Gun drill guides further function as a seal between the drill and the edges of an opening of a chip box through which the drill shaft extends and prevents the passage of lubricant and chips from the chip box around the drill.

Gun drill guides are disclosed, for example, in U.S. Pat. Nos. 3,361,014 and 5,181,812, which disclosures are incorporated herein by reference. Gun drill guides are also sold by The Whip Guide Company under the trademark GIZMO®.

A prior art gun drill guide is shown in FIG. 7 and consists of a cylindrical body member C of resilient polymer having a non-round central opening extending therethrough (not shown) and which includes a radially extending flange F at one end which engages a bearing assembly end face and a second radially extending flange F' at the opposite end and of lesser diameter than the flange F. Flange F' is of uniform thickness in the x direction. It engages an opposite bearing end face. Flanges F and F' are intended to hold the guide in place. The guide is inserted into a bearing, the bearing having a radius at each end face opening of the bearing. The guide must be pushed into the bearing and cylindrical body C fits snugly against the inner annular wall of the bearing. Thus, flange F' is pushed through the bearing opening, requiring a degree of force and deformation of flange F'. Accordingly, flange F' must remain somewhat pliable and can only be of a certain diameter and thickness. In use, as the bearing turns at high RPMs, e.g. 2000-10,000, the guide heats up. The heat causes the polymer of the guide to become more pliable and the guide tends to pop out of the bearing as flange F' is not of sufficient diameter or structure to hold it in place. This is necessarily detrimental and affects the efficiency and quality of the gun drilling operation and increases the expense of operation. When a drill guide pops out, the drill and the whip guide supports have to be disassembled to remove and replace the guide with a new one. This takes about 10 to 15 minutes.

Other prior art guides include a cylindrical body portion, a radially extending flange at one end thereof and an annular groove at the opposite end thereof which receives a snap ring to hold the guide in place. This type of prior art guide eliminates the force required to insert the guide, but requires the use of the snap ring. In practice, such guides also have a tendency to pop out of the bearing when the drill is operated at high rpms.

The tendency of a gun drill to whip, bow and vibrate is particularly a problem with smaller drill sizes such as one-quarter inch or smaller. This movement of the gun drill adversely affects the quality and efficiency of the gun drilling operation. If the gun drill whipping is controlled, the gun drill can be operated at higher rpms providing a higher chip rate, thereby allowing the drilling of gun barrels in 25% to 200% faster time. This provides a higher quality product and at a reduced cost. When using prior art guides at such higher RPMs, this generates even more bearing heat which results in the guide getting even hotter, thereby softening the guide and causing the guide to pop out of the bearing even more frequently.

The prior art gun drill assemblies utilize a deflector to deflect the metal chips and the chip lubricant generated during the drilling operation. The chip deflection prevents these materials from damaging the drill guide and the bearing in the chip box. The prior art chip deflectors consist of an annular plastic support having a metal disc on each side. The chip deflector includes a central opening generally sized to fit the drill shaft. The chip deflector fits on the drill shaft and floats on the shaft, generally toward the back of the chip box because of the lubricant pressure pushing it back. These chip deflectors have a tendency to get stuck on the drill shaft because chips get stuck behind it or the plastic seal gets damaged, all of which requires manual removal and down time of the machine. Also, when the chip deflector gets stuck on the shaft, the chip deflector moves forward with the drill shaft toward the workpiece causing the chips to clog the hole in the workpiece. If the drill is not stopped within seconds, estimated at about 3 to 15 seconds depending on drill feed ratio, to manually unstick the chip deflector, the drill shaft will bend between the whip guide supports, break the shaft and also break the drill tip off of the shaft.

As previously stated, the prior art chip deflectors get stuck and move forward on the shaft causing chips to build up in the drilled hole. Such build-up affects the cooling lubricant pressure since higher pressure is required to push the chips out of the drill hole. This is particularly problematic when drilling deep holes and requires higher lubricant pressure.

U.S. Pat. No. 5,181,812 discloses another type of chip deflector. This chip deflector incorporates a metal shield in the drill guide flange when molding the drill guide. The metal shield is said to prevent the drill guide from eroding when the guide flange is exposed in the chip box to the impingement of metal chips and/or the cutting lubricant. In practice, this is not used extensively or at all due to the extra step, difficulty and expense in molding this type of drill guide.

Accordingly, while the prior art gun drill guides and chip deflectors have been useful up to a point, improvement is necessary to overcome the above disadvantages and to provide more efficiency to the gun drilling operation.

OBJECTS AND SUMMARY OF THE INVENTION

A primary object of the invention is to provide a gun drill guide which is held securely in place during the drilling operation and which provides improved gun drilling operation, including controlling the whipping, bowing and vibration of the gun drill.

A further primary object of the invention is to provide a gun drill guide assembly which provides increased wear and durability and decreases the vibration of the gun drill.

A further primary object of the invention is to provide a gun drill guide assembly which includes a chip deflector assembly to provide protection to the bearing and the drill guide, to control the whipping of the drill, to secure the drill guide in place, and to increase the rate of production through more efficient operation.

Another object of the invention is to have a universal chip deflector assembly with a secure locking means. This will allow the chip deflector to be used with more than one size drill. The chip deflector has a universal body, i.e. a cap means, and a metal chip deflector for insertion therein. The metal chip deflector can be quickly removed from the cap and a new size inserted for use with a different size drill. The body or cap means may be reused.

A further primary object of the invention is to provide a gun drill guide for a gun drill or similar machine which is rotatably mounted in a support bearing assembly comprising a cylindrical body made of resilient polymer having an opening extending therethrough and which includes a first flange at one end of the body for seating on the bearing and an annular groove near the opposite end thereof defined by a second flange of lesser diameter for seating on the bearing and a third flange of even-lesser diameter. The annular groove between said second and third flanges may optionally receive a locking means or other attachment, including a chip deflector assembly.

A further primary object of the invention is to provide a gun drill guide assembly having a chip deflector for a gun drill or similar machine which is rotatably mounted in a support bearing assembly in the chip box of the gun drill assembly comprising a drill guide having a cylindrical body made of resilient polymer having an opening extending therethrough and which includes a first flange at one end of the body for seating on the bearing and an annular groove near the opposite end thereof defined by a second flange of lesser diameter for seating on the bearing and a third flange of even lesser diameter, thereby providing an annular groove between said second and third flanges for receiving a chip deflector adaptor and chip deflector assembly. The adaptor includes a cylindrical body portion whose inner wall is constructed and arranged at one end to mate with the guide and at the opposite end having an outwardly extending neck with a radially extending flange constructed and arranged to mate with the chip deflector assembly. The adaptor also serves to securely hold the guide in the chip box. The chip deflector assembly includes a cap and a removeable steel disc. The chip deflector assembly will deflect metal chips and lubricant during the drilling operation and adds longevity to the drill guide.

It is another object of the invention to provide a chip deflector assembly comprising a cap to be attached to a drill guide or adaptor and a metal disc which is securely held in the cap during operation. The metal disc can be removed and replaced and the cap may be used again, providing extended wear to the remainder of the assembly and reducing the cost of manufacture. The metal disc includes an opening sized to fit different drill sizes. Different metal discs for different drill sizes can be used with the same cap.

Another object of the invention is to provide a gun drill guide which is easy to install and remove from the gun drill guide assembly.

Another object of the invention is to provide a stabilizer assembly for the gun drill to further prevent whipping, bowing and vibration of the drill. The stabilizer assembly utilizes the gun drill guide of the invention in conjunction with male and female threaded metal connectors which thereby provide additional dampening to the drill.

The novel gun drill guide of the invention comprises a cylinder body member of a resilient polymer material having a central opening extending therethrough and which further includes a radially extending flange means at one end to engage the end face of a bearing support means and having an annular groove near the opposite end of the cylinder body formed by at least two radially extending flanges for optionally receiving a locking means. After the guide is inserted in the bearing and before it is installed on the gun drill, a locking means may optionally be used to hold the guide in place. The guide firmly engages the gun drill shaft.

The gun drill guide assembly of the invention for use in relation to a chip box comprises a drill guide having cylinder body member of a resilient polymer material having a central opening extending therethrough and which further includes a radially extending flange means at one end to engage the end face of a bearing support means and having an annular groove near the opposite end of the cylinder body formed by at least two radially extending flanges for optionally receiving a chip deflector adaptor means. Before the guide is installed on the gun drill, a chip deflector adaptor means is connected thereto. The adaptor means holds the guide in place and receives a chip deflector assembly. The chip deflector assembly includes a cap and a removeable steel disc. The cap may be made of a polymer or metal.

The chip deflector adaptor means includes a body portion constructed and arranged at one end to mate with the drill guide and at the opposite end having an outwardly extending neck with a radially extending flange constructed and arranged to mate with the chip deflector assembly. The chip deflector assembly includes a cap and a removeable steel disc or chip deflector. The chip deflector assembly may mate directly with the gun drill guide and without use of the adaptor.

BRIEF DESCRIPTION OF DRAWINGS

Other objects, advantages, and novel features of the present invention will become apparent from the following detailed description of the invention when considered in conjunction with the accompanying drawings, in which like reference numerals designate like parts throughout the FIGURES thereof, and wherein:

FIG. 1 is a cross-sectional view of a representative gun drill apparatus which includes the improved guide means and chip deflector assembly of the present invention;

FIG. 2 is an exploded view in partial cross-section of the bearing assembly and with the gun drill guide and locking ring of the invention;

FIG. 3 is an end view of the gun drill guide taken along line 3-3 of FIG. 1;

FIG. 7 is a prior art drill guide;

FIG. 8 is a side view of the drill guide of the invention;

FIG. 9 is an end view of the drill guide of the invention;

FIG. 10 is another embodiment of the drill guide of the invention;

FIG. 11 is a stabilizer for use with the drill guide of the invention;

FIG. 12 is another embodiment of the drill guide of the invention;

FIG. 13 is an exploded view of another embodiment of the chip deflector assembly;

FIG. 14 is a side sectional view taken along line 14-14 of FIG. 13;

FIG. 15 is a stabilizer assembly of the invention for use in a chip box;

FIG. 16 is a side sectional view of the stabilizer assembly of the invention for use in a chip box; and FIG. 17 is a side sectional view of the stabilizer assembly of the invention for use in a support member of a gun drill.

DETAILED DESCRIPTION OF THE PREFERRED EMBODIMENTS

Figure 4:
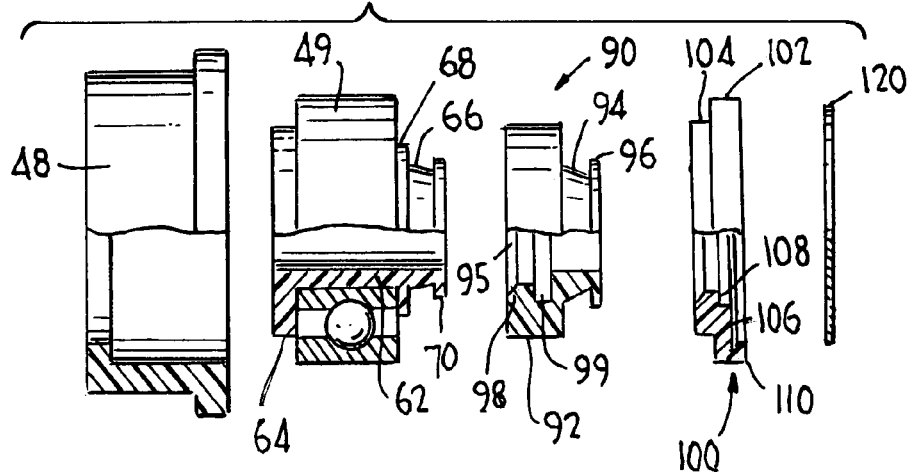
FIG. 4 is an exploded view in partial cross-section of the bearing assembly with the drill guide, adaptor and chip deflector assembly.

An improved gun drill guide and gun drill guide assembly are shown in FIGS. 1 through 17. Referring to FIG. 1, a representative gun drill apparatus 10 is shown for purposes of illustrating the guide of the invention. It is understood that the drill guide and drill guide assembly of the invention can be used in operations other than gun drilling and the inventions disclosed herein are not limited to gun drilling. Rather, the term "gun drilling" is used generically for drilling apparatus for making deep holes and using an extended drill shaft. For example, the inventions are useful in the auto industry for, among other things, drilling steering columns; the medical industry for drilling medical parts; the motorcycle industry for drilling axles; the oil industry for drilling shafts; the military for drilling pins for tanks, etc.

The gun drilling apparatus 10 is secured to a drilling apparatus 12 providing for various cutting operations to be conducted on a metal workpiece 14, e.g. a gun barrel. A horizontal rotational spindle 16 having a chuck means to secure the driver end of a gun drill shaft 18 is mounted in the conventional manner. This allows horizontal movement to advance or withdraw the drill shaft 18 from the workpiece 14. The drill shaft 18 is cylindrical and includes a V-shape 20 on one side thereof which terminates at end 22 in a cutting end 24. Cutting edges 26 and 28 are provided to the drill head enabling chips to be removed from the workpiece upon rotation of the drill member. An internal fluid passageway 30 extends from the driver end 32 of the drill to the cutting head enabling lubricant or coolant to be applied to the workpiece when performing various selected metal cutting operations including drilling, reaming, or the like.

A conventional chip box 34 is secured to the drilling apparatus 12 so that one end wall 36 engages the workpiece being machined with a central opening 38 being provided therein for emerging of the drill shaft. The opposite end wall 40 of the chip box includes a central opening 42 for passage of the drill shaft 18 to the workpiece 14. Upon rotation of the drill metal chips and cutting fluid are collected in the cavity 44 of the chip box 34.

Bearing assemblies 46 are provided and which include the improved guide 60 comprising the present invention. The bearing assemblies 46 are secured in end wall 40 of the chip box and support member 50 and provide support and alignment of the drill shaft 18 which is rotatably mounted therein. Drill shaft 18 passes through the opening 42 of the chip box 34 and opening 43 of the support 50. The bearing assembly 46 is conventional as disclosed, for example, in U.S. Pat. No. 5,181,812, which is incorporated herein by reference. The bearing assembly includes a bushing 48 and ball bearing assembly 49. The above arrangement is conventional in the art and may be modified without departing from the scope of the invention. This arrangement serves to prevent the tendency of the drill member to whip, bow or vibrate when rotated. It also prevents an escape of the metal chips and cutting fluid from the chip box.

Figure 5:
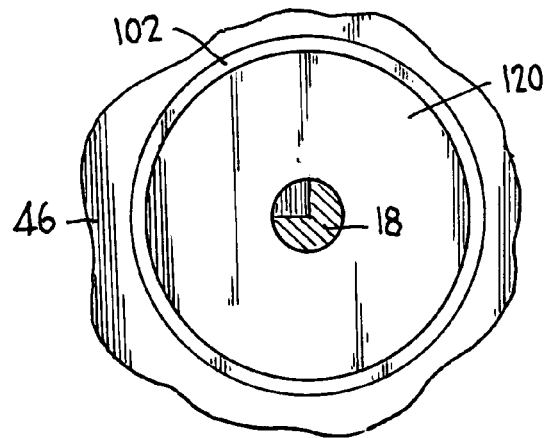
FIG. 5 is an end view of the chip deflector assembly taken along line 5-5 of FIG. 1.
Figure 6:
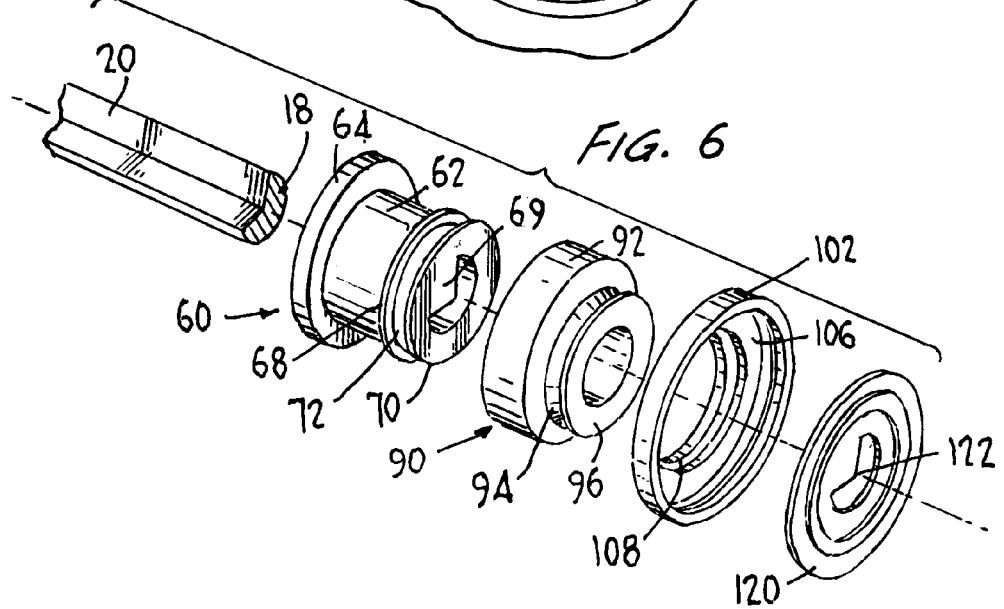
FIG. 6 is an exploded view of the drill shaft, drill guide, adaptor and chip deflector assembly.

The drill guide 60 of the invention as shown is capable of being secured in the bearing assembly 46 without any other means. In the alternative, a locking means may also be used to further secure the guide. As discussed in greater detail hereafter, FIGS. 2 and 3 illustrate the guide 60 in conjunction with a locking means 80 and as also shown in FIG. 1 on support member 50. FIGS. 4, 5 and 6 illustrate the drill guide 60 with the chip deflector as shown in FIG. 1 in relation to the chip box. It is understood that the drill guide 60 is the same in each of these preferred embodiments. It is further understood that the drill guide 60 may be used alone or with the locking means in the chip box without the chip deflector assembly.

The guide 60 of the present invention as shown, for example in FIG. 8, comprises a cylindrically shaped body 62. The guide is made of any suitable resilient polymer material, preferably flexible PVC. The polymer hardness is preferably 60-100 A Hardness Durometers. It is understood that other materials may also be useful. The guide 60 further includes a first radially extending flange 64 and an annular groove 66 defined by second and third radially extending flanges 68 and 70. Flange 68 is of a lesser diameter than flange 64 and flange 70 is of an even lesser diameter than flange 68, preferably less than the opening of bearing assembly 46. Flange 68 includes a shoulder 72 angling gradually into groove 66. The wall 74 of groove 66 is preferably of smaller diameter than body 62 and preferably decreases in diameter from flange 68 to flange 70. When the guide 60 is inserted into bearing assembly 46, the body 62 fits snugly against the interior bearing wall. Pressure is required to push the guide member 60 with flange 68 through the bearing opening. However, unlike the prior art guide, e.g., as shown in FIG. 7, the beveled shoulder 72 of flange 68 generally mates with the edge of the bearing opening for ease of insertion. Shoulder 72 of flange 68 also helps prevent the guide from popping out of the bearing when the drill is in use because it provides additional support and pressure on flange 68, unlike flange F' of prior art guides as shown, for example, in FIG. 7.

Reference will now be made to the gun drill guide as attached to support 50 and as shown in FIGS. 1-3. The guide 60 is secured within the bearing 46, which bearing assembly is secured in opening 43 of support 50. At one end of the cylindrical body 62 is the radially extending flange means 64 which engages the end face of bearing 49, as also shown in end view in FIG. 3. At the opposite end of cylindrical body 62 is annular groove 66 which passes through bearing 46. Projecting inwardly from the interior wall of the cylindrical body 62 is a V-shaped portion 69 (FIGS. 3 and 6) which is constructed and arranged to correspond to and mate with V-shaped portion 20 of drill shaft 18. As seen above, groove 66 is constructed and arranged to include first and second flange means 68 and 70. Flange 68 seats on the end face of bearing 46 and holds guide 60 firmly and securely in place. In the presently preferred embodiment, flange 68 is of a lesser diameter than flange 64, facilitating passage through the bearing opening. Flanges 68 and 70 form annular groove 66. The gradually decreasing diameter of the groove wall 74 facilitates attachment of a locking means. While the guide 60 is held in place without any additional means required, it is optional to use locking ring 80, made of aluminum or other suitable material. Locking ring 80 fits in groove 66, is held in place by flanges 68 and 70 and further serves to secure the drill guide.

Reference is now made to the gun drill guide and chip deflector assembly as shown best in FIGS. 1, 4, 5 and 6. The gun drill guide 60 is inserted through the opening in bearing assembly 46 as described above in the chip box 34 and includes connected thereto a chip deflector assembly. The chip deflector assembly serves to deflect metal chips and lubricant during the drilling operation. Among other things, it protects the drill guide 60 from wear and extends the life of the drill guide assembly, thereby saving time and expense from having to shut the drill down, remove the drill and insert a new drill guide. The drill guide and chip deflector assembly comprise the drill guide 60, adaptor 90, and cap 100 with steel disc 120 which includes opening 122 sized to correspond to drill shaft V-shape 20. It is not necessary to use the adaptor, and the chip deflector assembly of cap 100 and disk 120 may be attached directly to guide 60. Cap 100 is made of flexible polymer, such as PVC.

More specifically, adaptor 90 serves to lock the guide in place and to mate with the cap 100. It includes a body portion 92, neck portion 94 and radially extending flange 96. The body portion 92 includes an opening 95 which is constructed and arranged at one end to include an interior flange 98 forming a groove 99 for mating with flanges 68 and 70 of guide 60. Flange 68 seats on the outside of adaptor 90 and flange 70 is secured in groove 99. Adaptor 90 is attached to guide 60 as shown in FIG. 1.

The chip deflector assembly includes cap 100 and disc 120 which fits in cap 100. Cap 100 is constructed to connect with groove 66 of guide 60 or neck 94 of adaptor 90. Cap 100 includes a body portion 102, an outwardly extending ring portion 104, an inwardly extending face 106, an annular ring 108 and lip portion 110. The opening in ring 104 is preferably beveled for ease of insertion of flange 70 of guide 60 or flange 96 of adaptor 90.

Cap 100 is attached and secured to adaptor 90 by adaptor flange 96 seating on annular ring 108 of cap 100. Lip 106 secures disc 120 in place. The resilient polymer material (the same as guide 60) is sufficiently flexible to allow insertion and removal of disc 120 from cap 100.

Disc 120 is made of steel or other equivalent material and includes a central opening 122 sized to correspond and mate with the V-shape 20 of drill shaft 18. It is understood that this V-shape 20 of shaft 18 may be of different configurations depending on the drill shaft. The shape of the central opening of drill guide 60 and disc 120 will correspond thereto.

In the presently preferred embodiment, chip deflector adaptor means 90 is used with the chip deflector cap 100 and disc 120. However, it is understood that this is not essential and the cap 100 with disc 120 may be attached directly to guide 60.

Referring to FIG. 10 of the drawing, an alternate embodiment of a gun drill guide 130 is shown. Guide 130 is essentially two guides 60 connected at flanges 64. Thus, guide 130 includes a central flange 132, cylindrically shaped body portions 134a, 134b and annular grooves 136a, 136b defined by first radially extending flanges 138a, 138b and second radially extending flanges 140a and 140b. Flanges 138a, 138b include shoulder portions 142a, 142b. This guide is inserted into a bearing similar to guide 60, that is flange 132 will seat on the bearing end face and be held in place by one of flanges 138a or 138b seating on the opposite bearing end face. The other body portion 134 extend out of bearing 46. This latter body portion of the guide not within the bearing serves to provide further stabilization to the drill shaft. Additionally, a metal stabilizer 150 as shown in FIG. 11 can be connected to the body portion of the guide to further stabilize the drill shaft. Thus, the body portion of stabilizer 150 includes an opening 152 which is constructed and arranged at one end to include an interior flange 154 forming a groove 156 for mating with flange 138 of guide 130. Flange 132 seats on the outside of stabilizer 150 at end 158 and flange 138 seats on wall 159 of flange 154.

Referring to FIG. 12 of the drawing an alternate embodiment of the guide of the invention is shown. It is the same as guide 60 except that flange 64' is of greater width, e.g. 1.5 inches, thereby providing more stability to the drill.

Referring to FIGS. 13 and 14, an alternate cap 160 is disclosed for use with the chip deflector assembly. FIG. 13 is an exploded view showing cap 160 and metal disc 120. FIG. 14 is a cross section of cap 160 taken along line 14-14. Cap 160 is made of metal and constructed the same as cap 100 with the exception of modifications to lip portion 110 of cap 100 which is modified in cap 160 to allow insertion of disc 120 because the cap 160 is metal and not pliable. Cap 160 includes lip portion 162 which, in the preferred embodiment, circumscribes about one half of the cap circumference. The cap includes openings 164a, 164b and 164c and retaining members 168 extending from face 166. As seen in FIG. 14, cap 160 includes an outwardly extending ring 169 the same as annular ring 104 of cap 100. The disc 120 is inserted through openings 164 and over retainer members 168 and is held in place by lip 162 and retainer members 168. Guide 60 is connected to cap 160 the same as it is to cap 100 as referred to above.

Referring to FIGS. 15, 16 and 17, there is disclosed a stabilizer assembly for further preventing the whipping, bowing and vibration of the drill shaft. FIGS. 15 and 16 show a stabilizer assembly used in relation to the chip box and for receiving a chip deflector assembly. FIG. 17 discloses a stabilizer for use on a support 50. The stabilizer assembly includes threaded male and female metal portions which are held in place on the gun drill by using guides 60.

The stabilizer assembly for the chip box is shown in FIGS. 15 and 16. FIG. 15 is an exploded view and includes guides 60 and a first male stabilizer section 170 and a second female stabilizer section 172. Section 170 includes a body portion 174 and a threaded portion 176 which mates with a corresponding threaded portion 178 of section 172. Section 172 includes a body portion 180 and a radially extending flange 182 which is preferably of sufficient diameter to cover the bearing member 49 of bearing assembly 46. Referring to FIG. 16, stabilizer section 170 is inserted through the opening in bearing 49, the threaded portion 176 extending therethrough. Section 172 is screwed on to section 170. Additionally, allen screw 175 may be used to further hold the section 172 in place. The interior wall of section 170 includes an inner flange 182 which defines a groove portion 184. Guide body 62 fits snugly against flange 182. Flange 64 seats on the end face of section 170 and flange 68 seats on the end face of flange 182 and in groove 184. Section 172 includes an interior wall having interior flanges 186 on which flange 64 seats. Flange 68 seats on the end face of section 172. Attached to guide 60 is chip deflector assembly comprising cap 100 and disc 120. The chip deflector assembly is as previously described.

Referring to FIG. 17, there is disclosed a drill stabilizer assembly comprising male section 170 and female section 190. Male section 170 is the same as described above. Female section 190 is attached by thread means 192 to thread means 176 of male section 170. A guide 60 is included in section 200 the same as for section 170 described above. Section 190 includes an inner wall having a flange 194 which defines a groove 196 for receiving guide 60 flanges 70 and 68, respectively. Flange 68 of guide 60 seats on the wall of flange 194 and flange 64 (of a lesser diameter than the other Figures) of guide 60 seats on the end face of section 190. The stabilizer assembly is used in relation to the bearing assembly 46 on support 50 to further stabilize the gun drill.

While a preferred embodiment of the drill guide and drill guide assembly have been described in detail above, various modifications and variations of the invention are possible in light of the above teachings.

It is claimed:

1. A chip deflector assembly for attachment to a drill guide comprising a cap member having an opening therethrough and constructed and arranged to attach to said drill guide and a metal disc member constructed and arranged to seat in said cap member.

2. A chip deflector assembly according to claim 1 wherein said cap member comprises a resilient polymer material.

3. A chip deflector assembly according to claim 1, wherein said metal disc member is removably insertable in said cap member.

4. A chip deflector cap for a drill guide comprising a body portion having an opening extending therethrough and means for attachment to a drill guide and means for receiving a disk member in said cap.

5. A chip deflector cap according to claim 4 wherein said means for attachment to said drill guide comprises an annular ring.

6. A chip deflector cap according to claim 5 wherein said cap is made from material selected from the group consisting of metal and plastic.

7. A stabilizer assembly for a gun drill comprising a male section having means for attachment to a drill guide and a female metal section having means for attachment to a drill guide; said male and female sections further each having cooperating means for connection to each other.

8. A stabilizer assembly for a gun drill according to claim 7 wherein said means for connecting said male and female sections are thread means on said male portion and cooperating thread means on said female portion.

* * * * *